United States Patent [19]
Afek et al.

[11] Patent Number: 5,748,901
[45] Date of Patent: May 5, 1998

[54] FLOW CONTROL ALGORITHM FOR HIGH SPEED NETWORKS

[75] Inventors: Yehuda Afek, Hod Hasharon; Yishay Mansour, Tel Aviv; Zvi Ostfeld, Ramat Gan, all of Israel

[73] Assignee: Ramot University Authority Ltd., Tel Aviv, Israel

[21] Appl. No.: 651,176

[22] Filed: May 21, 1996

[51] Int. Cl.$^6$ .................................................. H04L 12/56
[52] U.S. Cl. ................... 395/200.68; 370/229; 370/232; 370/235; 395/200.65
[58] Field of Search ........................ 370/229, 231, 370/232, 235, 236, 238, 234, 237, 397, 412, 253, 395, 468; 395/200.13, 200.15, 200.68, 200.65; 340/825.51

[56] References Cited

U.S. PATENT DOCUMENTS

| | | | |
|---|---|---|---|
| 5,432,824 | 7/1995 | Zheng et al. | 375/356 |
| 5,434,860 | 7/1995 | Riddle | 370/84 |
| 5,515,359 | 5/1996 | Zheng | 370/13 |
| 5,583,857 | 12/1996 | Soumiya et al. | 233/233 |
| 5,633,859 | 5/1997 | Jain et al. | 370/234 |

OTHER PUBLICATIONS

Bertsekas, D.P. et al, "Data Networks", Prentice Hall, 1987, pp.448–456.
Roberts, L., Enhanced PRCA (Proportional Rate–Control Algorithm), Technical Report ATM–Forum/94–0735R1, Aug. 1994.
Siu, Kai–Yeung et al, "Adaptive Proportional Rate Control (APRC) with Intelligent Congestion Indication", Technical Report ATM–Forum/94–0888, Sep. 1994.
Barnhart, A.W., "Explicit Rate Performance Evaluations", Technical Report ATM–Forum/94–0983R1, Oct. 1994.
Jain, R. et al, "ERICA+: Extensions to the ERICA Switch Algorithm" ATM Forum/95–13646, Oct., 1995.
Jain, R. et al, "Rate Based Schemes: Mistakes to avoid", Technical Report ATM–Forum/94–0882, Sep. 1994.
Charny, A. et al, "Some Preliminary Results on the EPRCA Rate–Control Scheme", ATM–Forum/94–0941, Sep. 1994.
Bennett, J.C.R. et al, "Comments on the Jul. PCRA Rate Control Baseline", Technical Report ATM–Forum/94–0683, Jul. 1994.
Tsang, D.H. et al, "A New Rate–Based Switch Algorithm For ABR Traffic to Achieve Max–Min Fairness with Analytical Approximation and Delay Adjustment", Proc. 15th IEEE INFOCOMM, Mar. 1996.
Floyd, S. et al, "Random Early Detection Gateways for Congestion Avoidance", IEEE/ACM Transactions on Networking, 1(4):397–413, Aug. 1993.
Keshav, S., "A Control–Theoretic Approach to Flow Control", Proc. SIGCOMM, pp. 3–16 Sep. 1991.
Stevens, W., "TCP/IP Illustrated", Addison–Wesley, 1994 pp. 160–165.
Jacobson, V. et al, "Congestion Avoidance and Control", Proc. 18th SIGCOMM, pp. 314–329, Aug. 1988.
Brakmo, L.S. et al, "TCP Vegas: End To End Congestion Avoidance on a Global Internet", IEEE JSAC, 13,8:1465–1480, Oct. 1995.

Primary Examiner—Emanuel T. Voeltz
Assistant Examiner—Tony M. Cole
Attorney, Agent, or Firm—Mark M. Friedman

[57] ABSTRACT

A constant space algorithm for rate based flow control in large computer networks. The switches in the network dynamically measure their unused link capacity, and signal sessions with higher rates to reduce their rates to that unused link capacity. Sessions with lower rates are allowed to increase their rates. This algorithm is suitable for both ATM networks and suitably modified TCP networks.

37 Claims, 2 Drawing Sheets

```
Parameters:
    τ, α, β, QT, decreasing_factor, h utilization_factor
Variables:
    MACR, Δ, α_inc, α_dec, Σr
Initialization:
    Initialize the values of MACR and Fast_MACR to
    be some portion of the link capacity.
    amount of data received in last interval := 0
When a forward data is received:
    amount of data received in last interval :=
        amount of data received in last interval +
            size_of_current_data.
Every τ seconds time interval do:
    Choose α_inc and α_dec according to the current
    queue length and the current deviation.
    Σr := amount of data received in last interval
    Δ := min(Link_Capacity − Σr/τ, Link_Capacity/utilization_factor)
    If Δ > MACR then
        MACR := MACR·(1 − α_inc) + Δ·α_inc
    Else
        MACR := max(MACR·(1 − α_dec) + Δ·α_dec,
                    MACR·decreasing_factor)
    Fast_MACR := Fast_MACR·(1 − β) + Δ·β
    amount of data received in last interval := 0
For every backward RM cell do:
    ER field on cell := min(utilization_factor·MACR,
                            current ER field on cell,
                            2·CCR field on cell)
    If (MACR > 2·Fast_MACR) then
        Set the value of the NI bit in the RM cell
```

Parameters:
  $\tau, \alpha, \beta, QT, decreasing\_factor, h\ utilization\_factor$
Variables:
  $MACR, \Delta, \alpha_{inc}, \alpha_{dec}, \sum r$
Initialization:
  Initialize the values of $MACR$ and $Fast\_MACR$ to be some portion of the link capacity.
  $amount\ of\ data\ received\ in\ last\ interval := 0$
When a forward data is received:
  $amount\ of\ data\ received\ in\ last\ interval :=$
    $amount\ of\ data\ received\ in\ last\ interval +$
    $size\_of\_current\_data.$
Every $\tau$ seconds time interval do:
  Choose $\alpha_{inc}$ and $\alpha_{dec}$ according to the current queue length and the current deviation.
  $\sum r := amount\ of\ data\ received\ in\ last\ interval$
  $\Delta := min(Link\_Capacity - \frac{\sum r}{\tau}, \frac{Link\_Capacity}{utilization\_factor})$
  If $\Delta > MACR$ then
    $MACR := MACR \cdot (1 - \alpha_{inc}) + \Delta \cdot \alpha_{inc}$
  Else
    $MACR := max(MACR \cdot (1 - \alpha_{dec}) + \Delta \cdot \alpha_{dec},$
        $MACR \cdot decreasing\_factor)$
  $Fast\_MACR := Fast\_MACR \cdot (1 - \beta) + \Delta \cdot \beta$
  $amount\ of\ data\ received\ in\ last\ interval := 0$
For every backward RM cell do:
  $ER$ field on cell $:= min(utilization\_factor \cdot MACR,$
        current $ER$ field on cell,
        $2 \cdot CCR$ field on cell)
  If $(MACR > 2 \cdot Fast\_MACR)$ then
    Set the value of the $NI$ bit in the $RM$ cell

FIG. 1

| queue length | | | | | $\alpha_{inc}$ | $\alpha_{dec}$ |
|---|---|---|---|---|---|---|
| | queue length | $\leq$ | $QT$ | | $\alpha$ | $\alpha/16$ |
| $QT$ | $<$ | queue length | $\leq$ | $2QT$ | $\frac{\alpha}{2}$ | $\alpha/8$ |
| $2QT$ | $<$ | queue length | $\leq$ | $4QT$ | $\frac{\alpha}{4}$ | $\alpha/4$ |
| $4QT$ | $<$ | queue length | $\leq$ | $8QT$ | $\frac{\alpha}{8}$ | $\alpha/2$ |
| $8QT$ | $<$ | queue length | $\leq$ | $16QT$ | $\frac{\alpha}{16}$ | $\alpha$ |
| $16QT$ | $<$ | queue length | | | $\frac{\alpha}{32}$ | $2 \cdot \alpha$ |

FIG. 2

Every $\tau$ seconds time interval do:
 $ERR := MACR - \Delta$
 If $ERR \geq 0$ then
  $D_{neg} := D_{neg} \cdot (1 - h) + ERR \cdot h$
 Else
  $D_{pos} := D_{pos} \cdot (1 - h) + |ERR| \cdot h$
 $D := \min(D_{neg}, D_{pos})$
 $ratio := f(D)$ { See Figure 4 }
 $\alpha_{inc}^*, \alpha_{dec}^* := g(queue\ length, \alpha)$ { See Figure 2 }
 $\alpha_{inc} := \alpha_{inc}^* \cdot ratio$
 $\alpha_{dec} := \alpha_{dec}^* \cdot ratio$

FIG. 3

| $D$ | | | | | $ratio := f(D)$ |
|---|---|---|---|---|---|
| | | $D$ | $\leq$ | $MACR$ | 1 |
| $MACR$ | $<$ | $D$ | $\leq$ | $2\ MACR$ | $1/2$ |
| $2\ MACR$ | $<$ | $D$ | $\leq$ | $4\ MACR$ | $1/4$ |
| $4\ MACR$ | $<$ | $D$ | $\leq$ | $8\ MACR$ | $1/8$ |
| $8\ MACR$ | $<$ | $D$ | | | $1/16$ |

FIG. 4

FLOW CONTROL ALGORITHM FOR HIGH SPEED NETWORKS

FIELD AND BACKGROUND OF THE INVENTION

The present invention relates to flow algorithms for computer networks and, more particularly, to a constant space algorithm for rate based flow control of TCP-based and ATM-based networks.

A major goal of network protocols is to maximize the utilization of the network resources, such as bandwidth, while sharing the resources in a fair way among the users and applications. Flow control is the mechanism whose goal is to avoid and resolve data traffic congestion while ensuring high utilization and fairness among the different connections. As the speed and size of computer networks increase, flow control is becoming more and more critical and challenging. In such networks, a small mistake by the flow control mechanism for a tiny period of time quickly may result in clogging and in the loss of many messages.

There are several properties that are desirable in communications protocols generally, especially in protocols for large high-speed networks, and in flow control in particular: simplicity, minimal space requirements in both buffers and algorithm variables, short response time to bursty traffic requirements, and interoperability across several networks. In addition, flow control should have the property of fairness. While intuitively, fairness means fairly sharing the network bandwidth among different users, defining it rigorously in a network environment is not trivial. A widely accepted measure of fairness is "max-min fairness". See, for example, D. P. Bertsekas and R. G. Gallager, *Data Networks*, Prentice Hall, 1987, which is incorporated by reference for our purposes as if fully set forth herein. A bandwidth allocation is max-min fair if one cannot increase the bandwidth of any session without decreasing the bandwidth of sessions of equal or higher bandwidth.

The description of the present invention focuses on two important network architectures, ATM and TCP, although the present invention is not limited to these two architectures. These architectures are not necessarily exclusive, as they are aimed at different levels in the network structure. For various reasons, the two network communities use slightly different terminology. In ATM jargon, the interior nodes of the network are called "switches", and the data units transmitted across the network are called "cells". In TCP jargon, the interior nodes of the network are called "routers" or "gateways", and the data units transmitted across the network are called "packets". In what follows, the terms "switch", "router", and "gateway" will be used interchangeably, and the terms "cell" and "packet" will be used interchangeably. The pairwise connections between the nodes of the network will be called "links".

ATM is a new standard for high-speed networks that has been agreed upon by major leaders in the telecommunications and data communications industries. Many vendors already have designed and built ATM switches and other ATM network elements. ABR (Available Bit Rate) is a class of service in ATM networks that allows bursty data applications to use the available network bandwidth in a fair way, while trying to achieve a low cell loss rate. The ATM Forum on Traffic Management has adopted rate based flow control as the basic mechanism for flow control of ABR traffic. The basic principle of rate based flow control is as follows: A control message (Resource Management cell, RM cell) loops around the virtual circuit of each session. The RM cell contains several fields. One of those fields, called CCR (Current Cell Rate), "informs" the switches in its path about the session's ACR (Allowed Cell Rate). The most important field is called ER (Explicit Rate). This field is set initially to the session PCR (Peak Cell Rate), i.e., the maximum possible demand. On the RM cell's backward path, each switch may decrease the ER field in the RM cell, according to the congestion that it observes. When the RM cell arrives back at the source, the value in the ER field is the maximum rate at which the source may transmit. If ACR exceeds ER, the source sets ACR equal to ER. If ER exceeds ACR, the source may increase ACR. However, the source may not increase ACR immediately, but only gradually. The amount of increase in ACR is limited by a parameter, AIR (Additive Increase Rate).

Since the adoption of the rate based scheme by the ATM Forum as a standard for flow control, several proposals have been made for its implementation in the switch. There are two major classes of proposals. The first class is flow control algorithms with constant space, i.e., the number of variables used by the algorithm is constant, independent of the number of sessions passing through a port (we do not refer to the space used for queuing data). The second class is unbounded space algorithms, i.e., algorithms in which the space (the number of states) depends, usually linearly, on the number of connections. For large networks, constant space flow control algorithms are essential. The present invention belongs to the first class.

Among the constant space rate-based flow control algorithms that have been proposed in the ATM forum are EPRCA (L. Roberts, Enhanced PRCA (proportional rate-control algorithm), Technical Report ATM-FORUM/94-0735R1, August 1994, which is incorporated by reference for our purposes as if fully set forth herein), APRC (K. S. Siu and H. H. Tzeng, Adaptive proportional rate control (APRC) with intelligent congestion indication, Technical Report ATM-FORUM/94-0888, September 1994, which is incorporated by reference for our purposes as if fully set forth herein), CAPC (A. W. Barnhart, Explicit rate performance evaluation, Technical Report ATM-FORUM/94-0983R1, October 1994, which is incorporated by reference for our purposes as if fully set forth herein), and ERICA/ERICA+ (R. Jain, S. Kalyanaraman, R. Goyal, Sonia Fahmy and Fang Lu, ERICA+: Extensions to the ERICA switch algorithm, Technical Report ATM-FORUM/95-1346, Ohio State University, October 1995, which is incorporated by reference for our purposes as if fully set forth herein).

In EPRCA, the fair share parameter (MACR) is computed for each output port from the information received on the forward RM cells generated by the session's source end system. Both the exact way of computing MACR, and the way the session's rate is updated, depend on the state of the queue at a link. A link could be either "not congested" if its queue length is less than a certain threshold, "congested" if its queue length is above the threshold, or "very congested" if its queue length is above a higher threshold. If the link is not congested, the sessions'rates are not limited. However, when the link is either congested or very congested, then the rates are restricted by some fraction of MACR. That is, the queue size plays a major role in the control loop. Furthermore, it influences the MACR indirectly through RM cells that go from the switch to the end-system and back to the switch. This extra delay in the control loop is a source for inherent oscillations in the algorithm. Aside from the oscillations, the extra delay in the control loop may cause an unfair sharing of the bandwidth between sessions with vastly different round trip delays (Y. Chang, N. Golmie, L.

Benmohamed, and D. Su, Simulation study of the new rate-based EPRCA traffic management mechanism, Technical Report ATM-FORUM/94-0809, September 1994; R. Jain, S. Kalyanaraman, R. Viswanathan, and R. Goyal, Rate based schemes: Mistakes to avoid, Technical Report ATM-FORUM/94-0882, Ohio State University, September 1994; A. Charny, K. K. Ramakrishnan, J. C. R. Bennett, and G. T. Des Jardins, Some preliminary results on the EPRCA rate-control scheme, Technical Report ATM-FORUM/95-0941, September 1994; all three of which are incorporated by reference for our purposes as if fully set forth herein).

In a modification of EPRA called APRC, the definition of "congested" is changed. Rather than being a function of the queue length, it is now a function of the rate at which the queue length is changing. That is, if the derivative of the queue length is positive, then the link is said to be congested. Because the algorithm is insensitive to queue length, the queue length might increase more than it decreases while in the congested state. Therefore, in some scenarios, the queue length often might grow to exceed the "very congested" threshold.

CAPC uses the fraction of unused capacity to control the network flow. CAPC's estimate of the fair share is called ERS (Explicit Rate for Switch). The main parameter used to control the changes of ERS is the ratio, r, between the rate of incoming traffic and the target link capacity, which is some fraction, for example 95%, of the capacity allocated to ABR traffic. Let delta=1−r. If delta is positive then ERS is multiplied by an increase factor. Otherwise, ERS is reduced by a multiplicative decrease factor. In addition, if the queue length exceeds a certain threshold, then the switch instructs the source end-systems of the sessions to reduce their rates, using a special binary indication provided by the ATM standard on RM cells.

Because CAPC uses the binary indication bit in very congested states, it is prone to unfair behaviors (J. C. R. Bennett and G. T. des Jardins, Comments on the July PRCA rate control baseline, Technical Report ATM-FORUM/94-0682, July 1994, which is incorporated by reference for our purposes as if fully set forth herein). Sessions that cross many switches are likely to be "beaten down" and to get a constant smaller allocation than sessions that cross only a few switches.

In ERICA, the switch computes two basic parameters: The Load Factor z, which equals the input rate divided by the target rate, for example, 95% of the available link bandwidth, and the Fair Share FS, which is the target rate for the link utilization divided by the number of active sessions. Given these two parameters, the algorithm allows each session to change its rate to the larger of FS and the session's current rate divided by z. Hence, if the link is overloaded, sessions drop their rate towards FS, and if the link is underutilized, sessions may increase their rate.

In ERICA+, both z and FS are made functions of the delay that data suffers in going through the queue. The longer the delay, the larger z is made, and vice versa. The longer the delay, the smaller FS is.

These schemes have several advantages. First, the resulting queue length typically is very small, close to 1, and hence the delay is small, too. Second, the algorithm reacts rapidly to changes in the traffic requirements. Third, the algorithm is simple. The down side of both ERICA and ERICA+ (as was shown in D. H. K. Tsang and W. K. F. Wong, A new rate-based switch algorithm for ABR traffic to achieve max-min fairness with analytical approximation and delay adjustment, Proc. 15th IEEE INFOCOMM, March 1996, which is incorporated by reference for our purposes as if fully set forth herein) is that they may suffer from unfair bandwidth allocations. Therefore, even in a stable state they do not necessarily reach the max-min fairness allocation. One reason for this unfairness is that FS as calculated by the algorithm is not the fair share that the link would have in a max-min fair allocation. Furthermore, the way z is measured and updated also may introduce unfairness.

In order to achieve fast convergence, ERICA uses a table of Current Cell Rates (CCRs) for all the sessions passing through a link, thus requiring a non-constant amount of space and complicating the processing of the RM cells. The unfairness in ERICA and ERICA+ is even more severe when they are limited to constant space, i.e., without using tables of CCRs. In such a case, there is a scenario in which ERICA+ has a constant unfair allocation even on a single link where different sessions have very different delays.

The older, much more common network protocol, the one on which the Internet is based, is TCP/IP. The important difference between TCP and ATM in the present context is that TCP lacks an explicit rate indication analogous to ATM's ER field, and hence uses an implicit indication in order to adjust its rate. In the past few years, several new techniques for flow control of TCP traffic have been presented and employed. The introduction of a dynamic window size has improved significantly the throughput of the TCP protocols. There are two kinds of flow control mechanisms in TCP, those that operate at the end stations and those that operate at the routers/gateways.

Two of the mechanisms that have been proposed for flow control in the end stations are Reno (V. Jacobson, Congestion avoidance and control, Proc. 18th SIGCOMM, pp. 314–329, August 1988, which is incorporated by reference for our purposes as if fully set forth herein) and Vegas (L. S. Brakmo and L. L. Paterson, Tcp vegas: End to end congestion avoidance on a global internet, IEEE JSAC, 13,8:1465–1480, October 1995, which is incorporated by reference for our purposes as if fully set forth herein). They operate by adjusting the TCP window size. The basic idea is to increase the rate of the session until either data is lost or the round trip delay becomes too big.

Flow control at the routers works differently. Obviously, when the router buffer overflows, some packets are dropped. This is not the only possible reaction in case of congestion. The router may send an ICMP Source Quench message (W. Stevens, TCP/IP Illustrated, Addison-Wesley 1994, which is incorporated by reference for our purposes as if fully set forth herein), which would cause the source to decrease its window size, but this option is rarely used, because the Source Quench message overloads an already congested network.

Rather than reacting to congestion, the router may act to avoid it. In a more intelligent strategy called RED (S. Floyd and V. Jacobson, Random early detection gateways for congestion avoidance, IEEE/ACM Transactions on Networking, 1(4):397–413, August 1993, which is incorporated by reference for our purposes as if fully set forth herein), packets are dropped or Source Quench messages are sent when the queue length at a link of the router exceeds a certain threshold. The packet to be dropped, or the source to which a Source Quench message is sent, is selected according to some probability distribution on the packets. The RED approach reduces the queue lengths at the router but does not always guarantee fairness.

In another router mechanism (S. Keshav, A control-theoretic approach to flow control, Proc. SIGCOMM, pp.

3–16, September 1991, which is incorporated by reference for our purposes as if fully set forth herein), assuming that each router sends packets in a round robin order between the sessions that share the same output link, the maximum queuing delay of a router may be detected by sending two consecutive packets and measuring the time difference at which they reach the destination. This mechanism may achieve a high degree of fairness and does not depend on any specific network topology, but its implementation complicates the router architecture and requires the cooperation of all the routers.

In the absence of an explicit rate indication in TCP traffic, the following problems are likely to occur:

1. Unfair allocation. Only the last of the TCP flow control mechanisms described above comes close to achieving fairness.
2. Congestion detection. Some of the mechanisms described above assume that they can estimate the queuing delay by measuring the round trip delay (RTT). However, RTT is a combination of the total queuing delays along the path and the propagation delays. Because the source uses only the total delay, it is almost impossible to separate the two components, leaving a large degree of uncertainty about the queuing delay.
3. Sensitivity to parameters. The mechanisms described above are sensitive to variations in parameter values. For example, out of tune time threshold parameters may cause network underutilization. Alternatively, distinct parameters for different sessions may cause severe unfairness.

Finally, all of the algorithms described above are applicable either only to ATM networks or only to TCP networks. The flow control of the two types of networks are not naturally integrated.

There is thus a widely recognized need for, and it would be highly advantageous to have, a flow control algorithm for high speed ATM and TCP networks with the following desirable properties:

1. Scalability to large networks. The amount of space required to implement the algorithm should be independent of the number of different sessions that share a link.
2. Robustness. The algorithm should perform well under large variations of the parameters defined by the system administrator.
3. Fairness and utilization. The algorithm should allocate network bandwidth between the different sessions fairly.
4. Integration between TCP and ATM. The algorithm should be compatible with either ATM or TCP, and should facilitate flow control in integrated networks.
5. Stability. Session rates should oscillate around their optimal values with small amplitude oscillations.

Other desirable attributes of a flow control algorithm include:

6. Simple implementation. The algorithm preferably should use only shift and addition operations.
7. Fast reaction. The algorithm should respond rapidly to changes in the network environment.

SUMMARY OF THE INVENTION

According to the present invention there is provided a method of flow control in a network having at least one switch, the at least one switch receiving at least one forward cell from at least one source via one of at least one first link and transmitting the at least one forward cell to at least one destination via one of at least one second link, the at least one switch receiving at least one backward cell from the at least one destination via one of the at least one second link and transmitting the at least one backward cell to the at least one source via one of the at least one first link, each of the first and second links having a link capacity, L, the method comprising the steps of: for at least one link, selected from the group consisting of the at least one first link and the at least one second link of at least one of the at least one switch: (a) determining an unused bandwidth, $\Delta$; and (b) setting a maximum allowed cell rate, MACR, equal to a weighted average of the $\Delta$ and a prior value of the MACR, prior_MACR.

According to further features in preferred embodiments of the invention described below, the weights used in updating MACR depend on the level of network traffic (for example, the queue length and the evaluated statistic variance) and its rate of change.

According to still further features in the described preferred embodiments, the parameters of the algorithm are powers of two, so that all multiplications and divisions can be implemented by shift operations.

The basic idea of the algorithm is to keep a certain portion of the link capacity unused and to limit the rates of sessions sharing the link by the amount of the unused bandwidth on that link. $\Delta$ is defined to be the unused link capacity, i.e., the link capacity minus the sum of the rates of sessions that use the link. The rates of sessions that are above $\Delta$ are reduced towards $\Delta$, and the rates of sessions that are below may be increased. This mechanism reaches a steady state only when the unused capacity $\Delta$ is equal to the maximum rate of any session that crosses the link and all the sessions that are constrained by this link are at this rate. The value of $\Delta$ is easily computed in the output port of each link by counting the number of cells arriving at the queue of that port over an interval of time, subtracting this amount from the number of cells that could be transmitted in that interval, dividing by the length of the time interval, and converting to appropriate units of measurement. An alternative approach, which is somewhat inferior, is to compute the value of $\Delta$ by counting the number of cells transmitted via the link over an interval of time, subtracting this amount from the number of cells that could be transmitted in that interval, and, as before, dividing by the length of the time interval and converting to appropriate units of measurement.

If the link has several queues, for example a high priority queue and one or more low priority queues, and, because of network congestion, only the cells in some of the queues, for example, in the high priority queue, are actually being transmitted, $\Delta$ alternatively may be defined as the difference between the number of cells that could be transmitted in an interval of time and the number of cells arriving at some specific queues, for example, at the high priority queue, in that interval.

$\Delta$ is not used directly to constrain the rates of sessions crossing a link, because it may be noisy and unstable due to the inherent delay in the system and to the nature of the traffic. Instead, a weighted average of $\Delta$ is stored in a variable called MACR (Maximum Allowed Cell Rate). MACR is updated at the end of each time interval by the weighted sum of its previous value and the measured $\Delta$.

If only a few "heavy" sessions use the network, then the scheme might underutilize the available bandwidth. This may be avoided by restricting the sessions by a multiple of $\Delta$, rather than by $\Delta$ itself.

The use, by the algorithm of the present invention, of the absolute amount of unused bandwidth to control network flow is analogous to CAPC's use of the fraction of unused capacity. One difference, however, is that in CAPC it is necessary to know the amount of bandwidth available for the data traffic (ABR). In the algorithm of the present invention, it is enough to know the total capacity and to count the total amount of incoming traffic.

The robustness of the algorithm stems from the following observations:

1. In a stable environment, the algorithm converges to a steady state in which fairness is achieved. This fact follows from the property that all sessions that are constrained on some link get the same rate in a stable state.
2. Because the algorithm preserves a residual unused capacity, it smoothly accommodates the addition of a new session without a queue buildup.
3. Similarly, if the rate of some sessions that were constrained elsewhere increases, or if the available capacity is reduced, then, again, the algorithm smoothly adjusts to the changes, thus avoiding congestion. In case of increased load on the link, the mechanism reacts by lowering the rate of the large sessions even before congestion starts.

Implementing the algorithm in an ATM network is straightforward. If the ER field of a backward traveling RM cell exceeds the current value of MACR, then that ER field is set equal to the current value of MACR. Implementing the algorithm in a TCP environment is less straightforward, and will be described below.

BRIEF DESCRIPTION OF THE DRAWINGS

The invention is herein described, by way of example only, with reference to the accompanying drawings, wherein:

FIG. 1 is a listing of the pseudo-code of the ATM version of the algorithm;

FIG. 2 is a table for choosing the values of $\alpha_{inc}$ and $\alpha_{dec}$ according to the current queue length and the parameters queue_threshold and $\alpha$;

FIG. 3 is a listing of the pseudo-code for adjusting $\alpha_{inc}$ and $\alpha_{dec}$ to account for the variance of MACR;

FIG. 4 is a table for choosing the ratio by which to multiply $\alpha_{inc}$ and $\alpha_{dec}$ to account for the variance of MACR.

DESCRIPTION OF THE PREFERRED EMBODIMENTS

The present invention is of a flow control algorithm for large computer networks. Specifically, the present invention can be used to regulate traffic and maximize bandwidth utilization in an ATM or TCP network.

The principles and operation of a flow control algorithm according to the present invention may be better understood with reference to the drawings and the accompanying description.

Referring now to the drawings, FIG. 1 is a listing of the pseudo-code of a preferred embodiment of the present invention, intended for use in an ATM network. The heart of the algorithm is the computation of $\alpha$ and the updating of MACR every $\tau$ seconds. Conceptually, the updated MACR is a weighted average of the prior MACR and the current $\Delta$, i.e.:

$$MACR := MACR*(1-\alpha)+\Delta*\alpha$$

where $\alpha$ is a constant weighting coefficient between 0 and 1. The preferred embodiment of the present invention shown in FIG. 1 uses a more robust updating scheme. Consider the following scenario: a sudden burst causes $\Delta$ to be significantly smaller than before, or even to have a negative value, if the number of packets destined to that output port exceeds the link capacity. This sharp change in $\Delta$ causes MACR to be significantly smaller, which in turn causes the sessions to reduce their rates, and hence causes the network to be underutilized. Because a low rate session transmits fewer RM cells, it takes the system a long time to return to normal utilization. Because of this, and to keep MACR positive, a lower bound is provided below which MACR may not fall:

$$MACR:=\max(MACR*(1-\alpha)+\Delta*\alpha, MACR*f_D)$$

where $f_D$ is a decreasing factor.

If ACR exceeds MACR, it is possible that sessions for which the current rate is larger than MACR will cause the value of MACR to be decreased and hence to be underestimated. For example, assume a link in which two sessions are restricted and the bandwidth is 12. If one of those sessions is transmitting consistently at a rate of 8, a stable state can be achieved in which both MACR and the rate of the second session are set to 2. To avoid this phenomenon, which might cause unfairness, some preferred embodiments of the present invention, when computing $\Delta$, treat the load caused by the sessions for which the indicated rate exceeds MACR as though it were exactly MACR. In other words, in the counting of the cells arriving at the output port of each link, a cell whose ACR exceeds MACR is counted as only MACR/ACR cells. For example, if MACR equals 4 and a session has a rate of 8, then only half the cells transmitted by that session are counted in the computation of $\Delta$.

In the preferred embodiment of the present invention shown in FIG. 1, there are two weighting coefficients, $\alpha_{inc}$ and $\alpha_{dec}$. These are provided to avoid sensitivity to queue length. If the same weighting coefficient is used regardless of the size of the queue and the rate of change of the queue, then, if many sessions pass through the same link, the session rates may suffer large oscillations and never converge, and the queue length may grow without bound. To avoid this, $\alpha_{inc}$ is used when $\Delta$ is greater than the prior MACR, and $\alpha_{dec}$ is used when $\Delta$ is less than or equal to the prior MACR. Moreover, the actual values of the weighting coefficients depend on the queue length. When the queue length is relatively small, $\alpha_{inc}$ is large and $\alpha_{dec}$ is small. This shortens the convergence time of sessions and decreases the period of time in which the link is underutilized. When the queue length is large, $\alpha_{dec}$ is large and $\alpha_{inc}$ is small, to decrease the queue length and prevent large delays and data loss. FIG. 2 contains an example of a table for computing $\alpha_{inc}$ and $\alpha_{dec}$, based on a queue_threshold parameter and a base coefficient $\alpha$.

The first line of the pseudocode, in FIG. 1, in the block labeled "For every backward RM cell do:", implements the scheme described above for avoiding underutilization of the network in case only a few "heavy" sessions are using the network. The number compared to the value in the ER field of the backward traveling RM cell is not MACR itself, but MACR multiplied by a utilization factor $f_u$.

If the utilization factor $f_u$ is significantly greater than 1, or if many "greedy" sessions are constrained on the link, then the value of MACR computed by the algorithm of FIG. 1 may be very oscillatory. The reason for this is that small changes in MACR are multiplied by $f_u$ and subsequently affect all of the "greedy" sessions. FIG. 3 shows pseudocode for a method of stabilizing MACR, by computing its mean variation and modifying $\alpha_{inc}$ and $\alpha_{dec}$ accordingly. The mean variance of MACR is used in preference to the standard deviation of MACR because computing the mean variance does not require a square root computation.

The usual approach to computing the mean variance of MACR is to do the following computations:

E:=MACR−α

D:=D*(1−h)+ABS(E)*h where the weighting factor h is an inverse power of two, typically 1/16. This approach, however, can not distinguish between the case where D has a large value due to an external change, such as an addition or a removal of a new session, and the case where the large variation stems from the fact that a small change in MACR causes a large change in link utilization. Only in the second case is it desirable to smooth the changes on MACR in order to achieve convergence.

In order to distinguish between these two cases, two additional variables, $D_{pos}$ and $D_{neg}$, are used. $D_{pos}$ is the variation when Δ is less than MACR. $D_{neg}$ is the variation when Δ is greater than MACR. The variable D is set equal to the lesser of $D_{pos}$ and $D_{neg}$.

The motivation for this approach is as follows. In the case of large variance being caused by an external change, only one of the variables $D_{pos}$ and $D_{neg}$ assumes a large value. For example, if MACR is significantly small relative to Δ, then only $D_{neg}$ is large. However, if the large variance is caused by persistent large oscillations of MACR, then both variables are relatively large.

In FIG. 3, $\alpha^*_{inc}$ and $\alpha^*_{dec}$ represent the values of $\alpha_{inc}$ and $\alpha_{dec}$ computed without taking variance into account, for example, as shown in FIG. 2. FIG. 4 contains a table for computing the ratio used in FIG. 3 to decrease $\alpha^*_{inc}$ and $\alpha^*_{dec}$ to account for the variance D exceeding various thresholds in terms of MACR.

In preferred embodiments of the present invention, the parameters are either powers of 2 or 1 minus powers of 2. In this way, the algorithm can be implemented as addition and shift operations, without any need for multiplications or divisions. Preferred values of τ are 64 or 128 times the time required to transmit one cell, provided that that transmission time is fixed. Preferred values of queue_threshold are powers of 2. Preferred values of α are inverse powers of 2, for example, 1/16. Preferred values of $f_D$ are of the form $1-2^n$, for example, 3/4.

In some unfavorable cases, when there are sharp transients in the network, a large queue may be created temporarily. The worst such case seems to occur as follows:

1. A link is severely underutilized, for example, due to initialization or due to an abrupt termination of a long burst of a more privileged class of service (for example, VBR—Variable Bit Rate), and MACR becomes significantly large.
2. All sessions that are restricted to this link are allowed to get a rate equal to MACR, or to MACR*$f_u$.
3. If many sessions are restricted by this link, there might be an excessive overutilization of the link bandwidth.

In order to moderate the peak queue length during the transient period, the rate of the session is allowed to at most double during each round trip time. This is done by fetching the value of the CCR field in the RM cell and restricting the value of ER to be no more than a multiple of CCR, for example, twice CCR.

In a simulation of the present invention incorporating this restriction, the rate of some of the sessions kept doubling even as the queue length kept increasing significantly. Even though MACR eventually decreased severely, there was a considerable delay in the onset of this decrease in severe cases. Meanwhile, the sessions that were restricted on the link were assigned rates significantly above their optimal allocations.

To further reduce the maximum queue length, the most preferred embodiment of the present invention uses an additional mechanism. A second weighted average of Δ is computed, in the same way as MACR, except that, in order to allow this second weighted average to respond faster than MACR to excessive queue lengths, the weight assigned to the current measured value of Δ is much larger than the weight assigned to Δ in the computation of MACR. This second weighted average is updated faster than MACR when there is a change in the link utilization, and hence may allow a faster recognition of link over-utilization. Therefore, this second weighted average is called the "Fast Maximum Allowed Cell Rate", or "Fast_MACR". Formally, Fast_MACR:=Fast_MACR*(1−β)+Δ*β where the value of the parameter β is significantly larger than the value of the parameter α used to compute MACR. If MACR is significantly larger than Fast_MACR, then MACR may be too large because of the latency of the computation. In that case, the NI (No Increase) field in each RM cell is set. This prevents the sources from further increasing their rates until MACR attains a reasonable value.

The preferred embodiments of the present invention described above are intended for use in an ATM network. The algorithm of the present invention also may be implemented in a suitable TCP network. It is assumed that most routers are able to compute the appropriate value of MACR. This assumption is based on the fact that most routers trace the link utilization, and therefore have the approximate value of Δ. For example, if a router supports SNMP ("Simple Network Management Protocol"), then the link utilization probably can be fetched from the appropriate MIBs (Management Information Bases). The TCP network must satisfy two conditions to allow the algorithm to be implemented. First, the sources must be able to translate MACR to an appropriate window size. Second, the routers, and possibly the TCP/IP header, must have been modified to enable the routers to inform the sources when their rates exceed MACR.

Implementing a TCP version of the algorithm of the present invention is simplest if the routers support SNMP. In such a TCP network, the source periodically polls the routers on the path to the destination. In each polling, the source fetches the MACR values of the links of those routers, and adjusts its window according to the minimum MACR. The drawbacks of this approach are that it consumes additional network resources and that it may suffer from delay problems.

Other implementations are suited to TCP networks in which the TCP/IP header is modified to include a field that contains the current rate of the source (in addition to the current existing window rate based end to end flow control, such as Reno or Vegas):

1. Explicit Rate Indication: In a TCP network in which a mechanism similar to the ABR rate based flow control of ATM is implemented, a system similar to the ATM implementation is used: the router indicates the ER on backward packets, and the source station adjusts the window size according to the received ER.
2. Selective Source Quench: The router sends Source Quench messages to sources whose connection rate is above MACR. The source reacts to the receipt of a Source Quench message as if a packet was dropped, and decreases its rate appropriately. As before, this message might consume scarce network bandwidth at a time of congestion.

3. Selective set of EFCI (Explicit Forward Congestion Indication) bit: The router sets the EFCI bit in packets whose indicated rate is above MACR. The reaction of the source to the receipt of a packet with a set EFCI bit is analogous to that when receiving a source quench message.

4. Selective RED: The router applies the RED mechanism, but drops packets or sets the EFCI bit only if their indicated rate is larger than MACR. This is fairer than unmodified RED because it is selective in the packets that are dropped.

5. Priority Queue: This implementation is suitable for routers whose output links have several queues. The key idea is that the router gives priority to well-behaved sessions. Sessions whose rate exceeds MACR are considered misbehaved and get worse service. In one example of this implementation, a router that has three queues designates one queue as a "fast", or "high priority", queue, that serves packets from sessions whose rate is smaller than or equal to MACR, and designates the other queues as "low priority" queues. The second queue is designated as a "medium" queue that serves packets from sessions whose rate is between MACR and twice MACR. The third queue is designated as a "slow" queue for packets from sessions whose rate is larger than twice MACR. If there are packets in the fast queue, then the router sends them. If the fast queue is empty, then the router sends packets from the medium queue. If both the fast queue and the medium queue are empty, then the router sends packets from the slow queue. If a queue is full, packets that otherwise would be placed in that queue are placed in a lower priority queue. This approach enhances fairness by penalizing sessions whose rate exceeds MACR. An advantage of this implementation is that both the delay and the throughput of "well-behaved" sessions, whose rate is less than MACR, is not affected by the "misbehaved" sessions, whose rate is larger than MACR.

While the invention has been described with respect to a limited number of embodiments, it will be appreciated that many variations, modifications and other applications of the invention may be made.

What is claimed is:

1. A method of flow control in a network having at least one switch, the at least one switch receiving at least one forward cell from at least one source via one of at least one first link and transmitting the at least one forward cell to at least one destination via one of at least one second link, the at least one switch receiving at least one backward cell from the at least one destination via one of the at least one second link and transmitting the at least one backward cell to the at least one source via one of the at least one first link, each of the first and second links having a link capacity, L, the method comprising the steps of:

for at least one link, selected from the group consisting of the at least one first link and the at least one second link of at least one of the at least one switch:
(a) determining an unused bandwidth, $\Delta$; and
(b) setting a maximum allowed cell rate, MACR, equal to a weighted average of said $\Delta$ and a prior value of said MACR, prior_MACR.

2. The method of claim 1, wherein said $\Delta$ is determined by the steps of:

(a) counting a number, N, of the at least one forward cell transmitted by said at least one link, selected from the group consisting of the at least one first link and the at least one second link of said at least one of the at least one switch, in a time interval, $\tau$; and (b) setting said $\Delta$ equal to $L - N/\tau$.

3. The method of claim 2, wherein said at least one link, selected from the group consisting of the at least one first link and the at least one second link of said at least one of the at least one switch, requires a fixed transmission time to transmit each of the at least one cell, wherein said $\tau$ is a power of two times said transmission time, and wherein said division of said N by said $\tau$ is performed by a shift operation.

4. The method of claim 1, wherein said at least one link, selected from the group consisting of the at least one first link and the at least one second link of said at least one of the at least one switch, has a queue, and wherein said $\Delta$ is determined by the steps of:

(a) counting a number, N, of the at least one forward cell arriving at said queue in a time interval, $\tau$; and (b) setting said $\Delta$ equal to $L - N/\tau$.

5. The method of claim 4, wherein said at least one link, selected from the group consisting of the at least one first link and the at least one second link of said at least one of the at least one switch, requires a fixed transmission time to transmit each of the at least one cell, wherein said $\tau$ is a power of two times said transmission time, and wherein said division of said N by said $\tau$ is performed by a shift operation.

6. The method of claim 1, wherein said at least one link, selected from the group consisting of the at least one first link and the at least one second link of said at least one of the at least one switch, has a plurality of queues, and wherein said $\Delta$ is determined by the steps of:

(a) counting a number, N, of the at least one forward cell arriving at at least one of said plurality of queues in a time interval, $\tau$; and (b) setting said $\Delta$ equal to $L - N/\tau$.

7. The method of claim 6, wherein said at least one link, selected from the group consisting of the at least one first link and the at least one second link of said at least one of the at least one switch, requires a fixed transmission time to transmit each of the at least one cell, wherein said $\tau$ is a power of two times said transmission time, and wherein said division of said N by said $\tau$ is performed by a shift operation.

8. The method of claim 1, wherein the at least one forward cell includes an allowed cell rate field containing an allowed cell rate, A, and wherein said $\Delta$ is determined by the steps of:

(a) initializing a number, N, to zero;

(b) for each of the at least one forward cell transmitted by said at least one link, selected from the group consisting of the at least one first link and the at least one second link of said at least one of the at least one switch, in a time interval, $\tau$:
if said A exceeds said prior_MACR:
(i) adding prior_MACR/A to n,
otherwise:
(ii) adding one to N; and (c) setting said $\Delta$ equal to $L - N/\tau$.

9. The method of claim 8, wherein said at least one link, selected from the group consisting of the at least one first link and the at least one second link of said at least one of the at least one switch, requires a fixed transmission time to transmit each of the at least one cell, wherein said $\tau$ is a power of two times said transmission time, and wherein said division of said N by said $\tau$ is performed by a shift operation.

10. The method of claim 1, wherein said MACR is determined by the steps of:
   (a) choosing an increasing weighting factor, $\alpha_{inc}$, and a decreasing weighting factor, $\alpha_{dec}$; and
   (b) if said $\Delta$ exceeds said prior_MACR:
      (i) setting said MACR equal to prior_MACR*$(1-\alpha_{inc})$ +$\Delta$*$\alpha_{inc}$,
   otherwise:
      (ii) setting said MACR equal to the greater of prior_MACR*$(1-\alpha_{dec})$+$\Delta$*$\alpha_{dec}$ and prior_MACR*$f_D$, where $f_D$ is a decreasing factor.

11. The method of claim 10, wherein said $\alpha_{inc}$ and said $\alpha_{dec}$ are inverse powers of two, and wherein said multiplications by said $\alpha_{inc}$ and said multiplications by said $\alpha_{dec}$ are performed by shift operations.

12. The method of claim 10, wherein said $\alpha_{inc}$ and said $\alpha_{dec}$ are equal.

13. The method of claim 12, wherein said $\alpha_{inc}$ and said $\alpha_{dec}$ are held constant.

14. The method of claim 10, wherein said at least one link, selected from the group consisting of the at least one first link and the at least one second link of said at least one of the at least one switch, has a queue having a queue length, and wherein said $\alpha_{inc}$ and said $\alpha_{dec}$ are chosen by comparing said queue length to a queue threshold.

15. The method of claim 14, wherein said queue threshold is a power of two.

16. The method of claim 14, wherein said $\alpha_{inc}$ is obtained by multiplying a factor, $\alpha$, by a first power of two, wherein said $\alpha_{dec}$ is obtained by multiplying said $\alpha$ by a second power of two, and wherein said multiplications are performed by shift operations.

17. The method of claim 16, wherein $\alpha_{inc}$*$\alpha_{dec}$ is held constant.

18. The method of claim 16, wherein said $\alpha$ is an inverse power of two.

19. The method of claim 10, wherein said $f_D$ is 1 minus an inverse power of two, and where said multiplication of said prior_MACR by said $f_D$ is performed by a shift operation and by an addition operation.

20. The method of claim 10, wherein said $f_D$ is a power of two, and wherein said multiplication of said prior_MACR by said $f_D$ is done by a shift operation.

21. The method of claim 10, further comprising the steps of:
   (a) setting an error, E, equal to MACR—$\Delta$;
   (b) if said E is positive:
      (i) setting a first variation, $D_{pos}$, equal to a weighted average of said E and a prior value of said $D_{pos}$, prior_$D_{pos}$,
   otherwise:
      (ii) setting a second variation, $D_{neg}$, equal to a weighted average of the negative of said E and a prior value of said $D_{neg}$, prior_$D_{neg}$; and
   (c) if the lesser of said $D_{pos}$ and said $D_{neg}$ exceeds a threshold, decreasing said $\alpha_{inc}$ and said $\alpha_{dec}$.

22. The method of claim 21, wherein said $D_{pos}$ is determined by the steps of:
   (a) choosing a weighting factor, h; and
   (b) setting $D_{pos}$ equal to E*h+prior_$D_{pos}$*$(1-h)$.

23. The method of claim 22, wherein said h is an inverse power of two, and wherein said multiplications by h are performed by shift operations.

24. The method of claim 21, wherein said $D_{neg}$ is determined by the steps of:
   (a) choosing a weighting factor, h; and
   (b) setting $D_{neg}$ equal to E*h+prior_$D_{neg}$*$(1-h)$.

25. The method of claim 24, wherein said h is an inverse power of two, and wherein said multiplications by h are performed by shift operations.

26. The method of claim 21, wherein said decreasing of said $\alpha_{inc}$ and of said $\alpha_{dec}$ is done by multiplying said $\alpha_{inc}$ and said $\alpha_{dec}$ by a ratio.

27. The method of claim 26, wherein said ratio is an inverse power of two, and wherein said multiplications are done by shift operations.

28. The method of claim 1, wherein at least one of the at least one backward cell is a control cell having an explicit rate field containing an explicit rate, the method further comprising the step of: if said explicit rate exceeds said MACR*$f_u$, where $f_u$ is a utilization factor, setting said explicit rate equal to MACR*$f_u$.

29. The method of claim 28, wherein said utilization factor is a power of two, and wherein said multiplication of said MACR by said $f_u$ is done by a shift operation.

30. The method of claim 28, wherein said control cell has a current cell rate field containing a current cell rate, and wherein said control cell has a no increase field, the method further comprising the steps of:
   (a) if said explicit rate exceeds a first multiple of said current cell rate, setting said explicit rate equal to said first multiple of said current cell rate;
   (b) setting a fast maximum allowed cell rate, Fast_MACR, equal to a weighted average of said $\Delta$ and a prior value of said Fast_MACR; and
   (c) if said MACR exceeds a second multiple of said Fast_MACR, setting said no increase field.

31. The method of claim 30, wherein said first multiple of said current cell rate is twice said current cell rate, and wherein said second multiple of said Fast_MACR is twice said Fast_MACR.

32. The method of claim 1, wherein the at least one source has a window of an adjustable size, the method further comprising the steps of:
   (a) receiving said MACR from said one of the at least one switch; and
   (b) adjusting said size of said window according to said at least one MACR.

33. The method of claim 1, wherein the at least one source has a rate, the method further comprising the step of instructing the at least one source to decrease said rate.

34. The method of claim 33, wherein said instructing is done by sending a Source Quench message to said at least one source.

35. The method of claim 33, wherein at least one cell, selected from the group consisting of the at least one forward cell and the at least one backward cell, includes a congestion indication bit, and wherein said instructing is done by setting said congestion indication bit.

36. The method of claim 1, wherein at least one cell, selected from the group consisting of the at least one forward cell and the at least one backward cell, includes a rate field containing a rate, the method further comprising the step of: if said rate exceeds said MACR, dropping said at least one cell.

37. The method of claim 1, wherein said at least one source has a rate, and wherein said at least one link, selected from the group consisting of the at least one first link and the at least one second link of said at least one of the at least one switch, has a high priority queue and at least one low priority queue, the method further comprising the step of: if said rate exceeds said MACR:

(a) transmitting at least one cell, selected from the group consisting of the at least one forward cell and the at least one backward cell, via one of said at least one low priority queue,
otherwise:

(b) transmitting at least one cell, selected from the group consisting of the at least one forward cell and the at least one backward cell, via said high priority queue.

* * * * *

UNITED STATES PATENT AND TRADEMARK OFFICE
CERTIFICATE OF CORRECTION

PATENT NO. : 5,748,901

DATED : May 5, 1998

INVENTOR(S) : Yehuda Afek et al

It is certified that error appears in the above-identified patent and that said Letters Patent is hereby corrected as shown below:

Column 13, lines 61 - change "$D_{pos}$" to "$D_{pos}$".

Column 14, line 1 - change "$D_{pos}$" to --$D_{neg}$--.

Signed and Sealed this

Twenty-ninth Day of September, 1998

*Attest:*

BRUCE LEHMAN

*Attesting Officer*      *Commissioner of Patents and Trademarks*